United States Patent
Kim et al.

(10) Patent No.: US 12,549,016 B2
(45) Date of Patent: Feb. 10, 2026

(54) ENERGY STORAGE SYSTEM FOR OPTIMAL OPERATION OF NEWLY INSTALLED BATTERY RACK AND CONTROL METHOD THEREFOR

(71) Applicant: LG ENERGY SOLUTION, LTD., Seoul (KR)

(72) Inventors: Jongcheol Kim, Daejeon (KR); Byeongho Mun, Daejeon (KR); Inho Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 44 days.

(21) Appl. No.: 18/688,284

(22) PCT Filed: Jan. 6, 2023

(86) PCT No.: PCT/KR2023/000317
§ 371 (c)(1),
(2) Date: Feb. 29, 2024

(87) PCT Pub. No.: WO2023/182628
PCT Pub. Date: Sep. 28, 2023

(65) Prior Publication Data
US 2024/0388103 A1    Nov. 21, 2024

(30) Foreign Application Priority Data

Mar. 21, 2022   (KR) .................. 10-2022-0034429

(51) Int. Cl.
*H02J 3/46*       (2006.01)
*G01R 31/382*    (2019.01)
(Continued)

(52) U.S. Cl.
CPC .............. *H02J 3/46* (2013.01); *G01R 31/382* (2019.01); *H02J 3/32* (2013.01); *H02J 7/0013* (2013.01); *H02J 2207/20* (2020.01)

(58) Field of Classification Search
CPC .... H02J 3/46; H02J 3/32; H02J 7/0013; H02J 2207/20; H02J 7/0042; H02J 1/102; H02J 7/0018; G01R 31/382; G01R 31/36
(Continued)

(56) References Cited

U.S. PATENT DOCUMENTS 9,825,474 B2    11/2017   Tohara et al.
2016/0226268 A1   8/2016   Okui
(Continued)

FOREIGN PATENT DOCUMENTS

JP    2013-101500 A    5/2013
JP    2015-195674 A    11/2015
(Continued)

OTHER PUBLICATIONS

International Search Report for PCT/KR2023/000317 mailed on Apr. 28, 2023.
(Continued)

*Primary Examiner* — Richard Tan
(74) *Attorney, Agent, or Firm* — Birch, Stewart, Kolasch & Birch, LLP

(57) ABSTRACT

Discussed is an energy storage system that may include a plurality of first battery racks; a central DC/DC converter connected to the plurality of first battery racks and configured to perform power conversion; a plurality of second battery racks; and a plurality of DC/DC converters connected to the plurality of second battery racks respectively and configured to perform power conversion. Here, the central DC/DC converter and the plurality of DC/DC converters are connected in parallel to a DC bus connected to at
(Continued)

Previously installed BPU Racks    New DC/DC Racks least one of a power conversion device (PCS) and a power generation device.

16 Claims, 8 Drawing Sheets

(51) Int. Cl.
  *H02J 3/32* (2006.01)
  *H02J 7/00* (2006.01)
(58) Field of Classification Search
  USPC .......................................................... 307/24
  See application file for complete search history.

(56) References Cited

U.S. PATENT DOCUMENTS

| | | | |
|---|---|---|---|
| 2017/0093187 A1 | 3/2017 | Park et al. | |
| 2018/0226811 A1 | 8/2018 | Hanada et al. | |
| 2021/0021134 A1 | 1/2021 | Alipoor et al. | |
| 2021/0151997 A1 | 5/2021 | Henke et al. | |
| 2021/0194255 A1 | 6/2021 | Choi et al. | |

FOREIGN PATENT DOCUMENTS

| | | | |
|---|---|---|---|
| JP | 2019-92339 A | | 6/2019 |
| KR | 10-2015-0138900 A | | 12/2015 |
| KR | 10-2016-0094228 A | | 8/2016 |
| KR | 10-2017-0036330 A | | 4/2017 |
| KR | 10-2030872 B1 | | 10/2019 |
| KR | 102198040 | * | 1/2021 |
| KR | 10-2021-0058660 A | | 5/2021 |
| KR | 10-2022-0034429 A | | 3/2022 |

OTHER PUBLICATIONS

Extended European Search Report for European Application No. 23775131.8, Jan. 14, 2025.
Japanese Office Action for Japanese Application No. 2024-514709, dated Feb. 25, 2025, with English translation.

\* cited by examiner

[Figure 1] Conventional Art
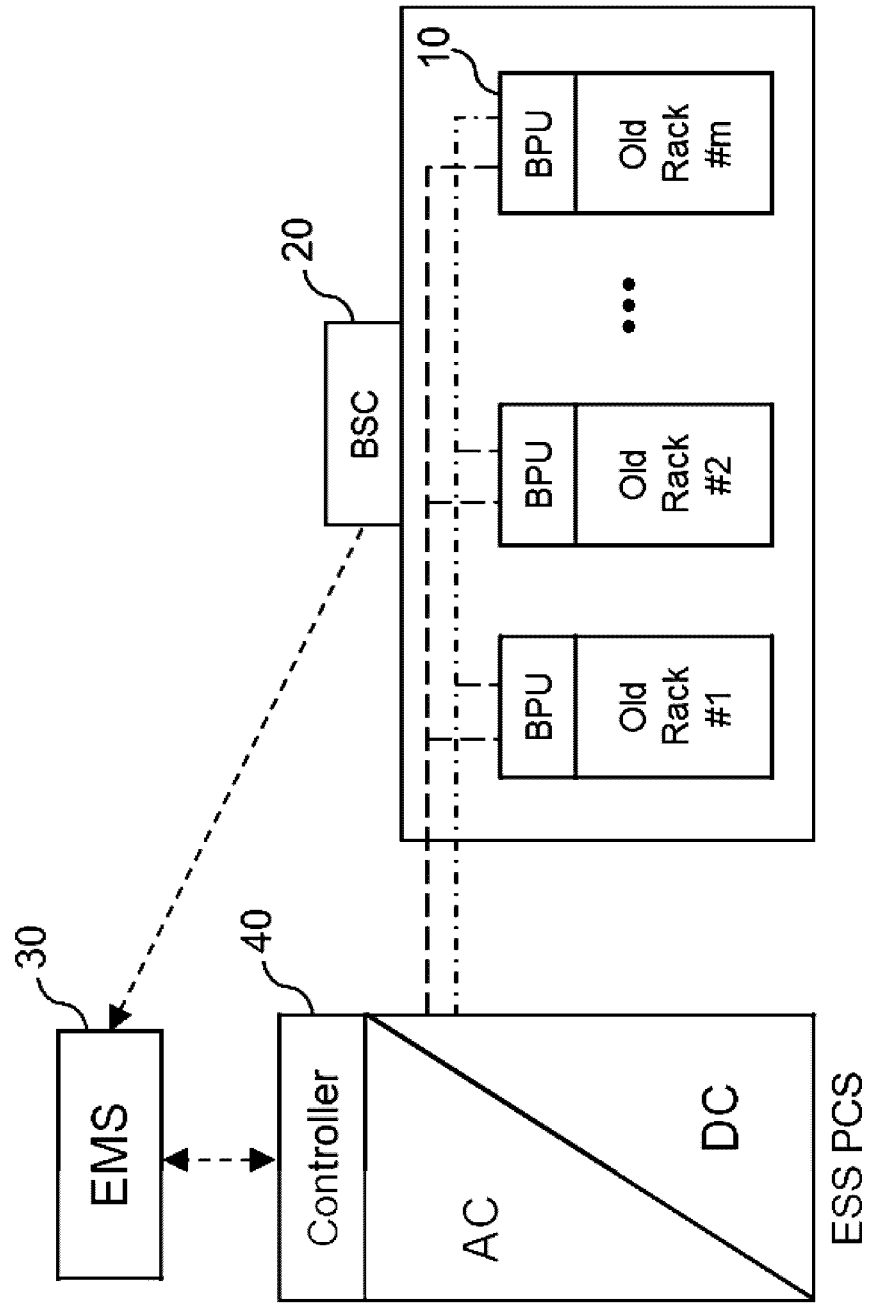

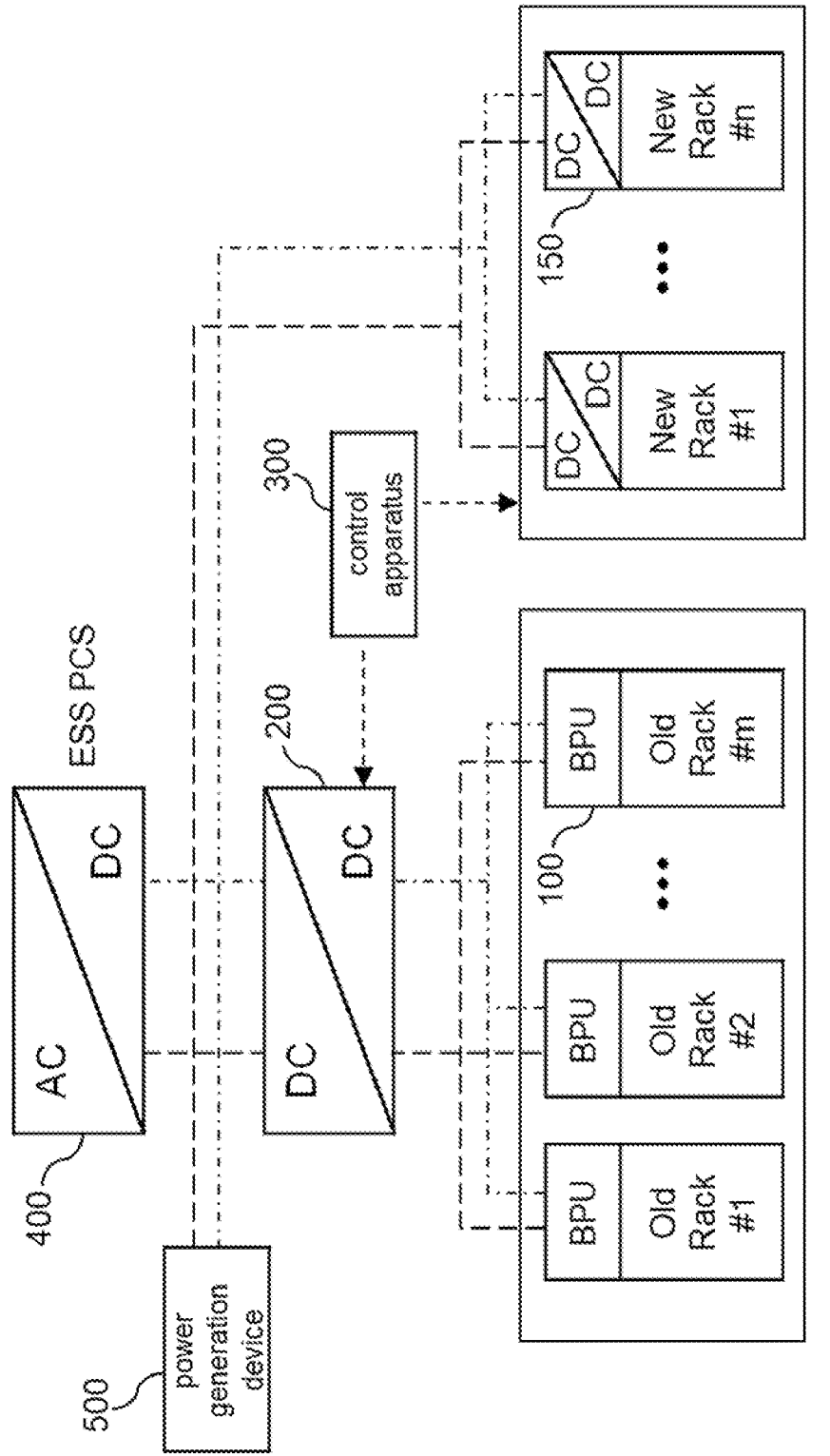
[Figure 2]

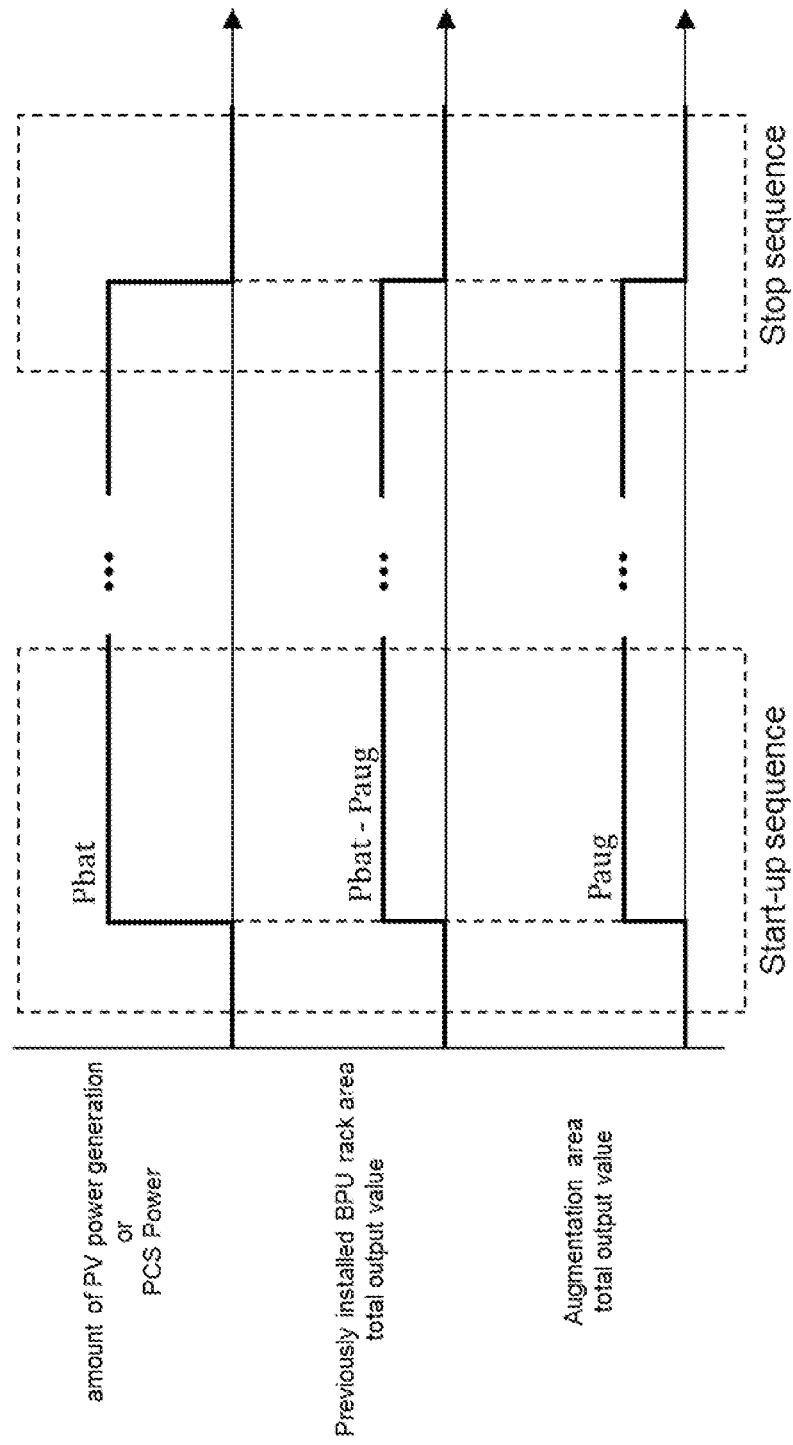
[Figure 3]

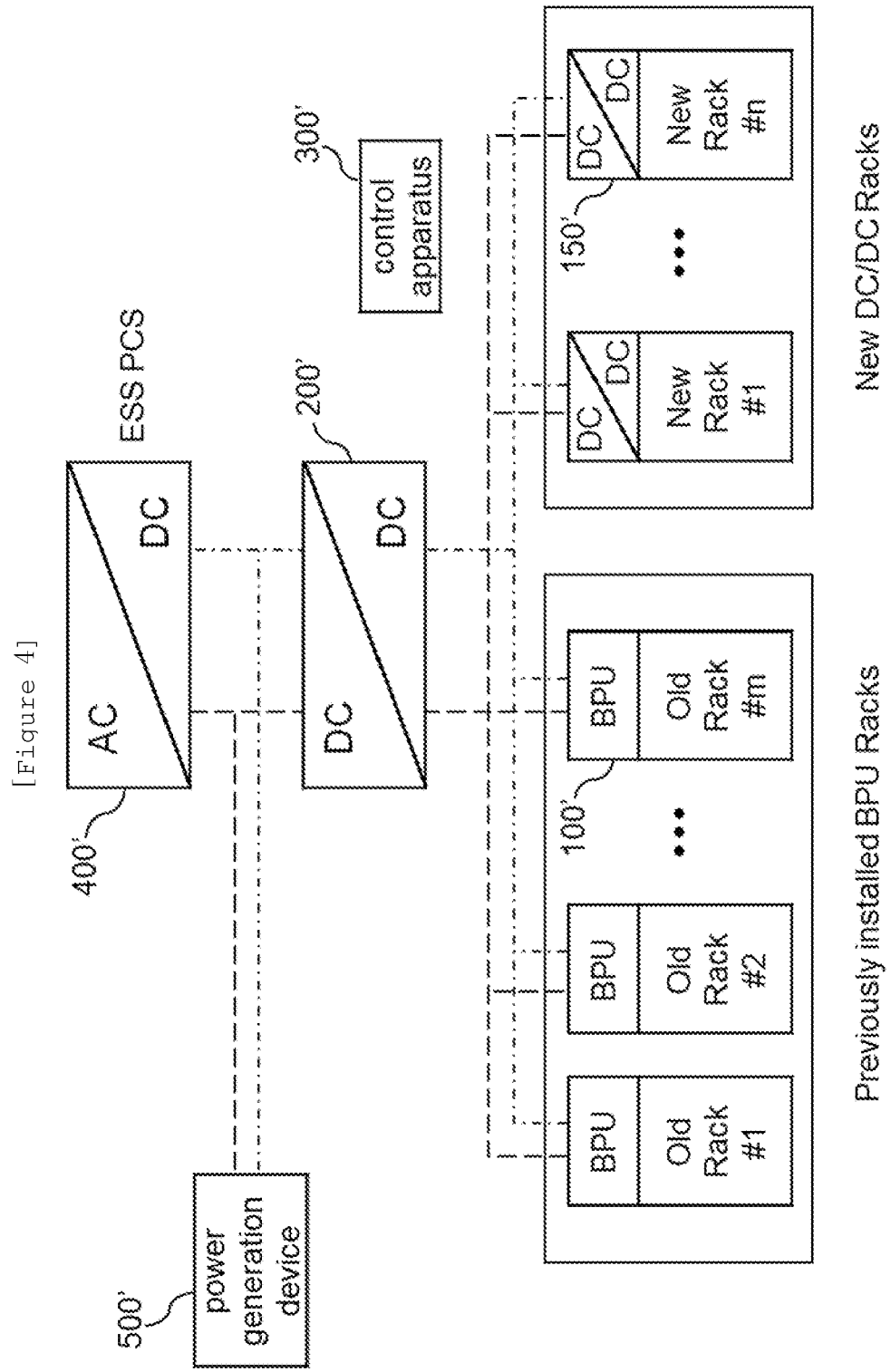
[Figure 4]

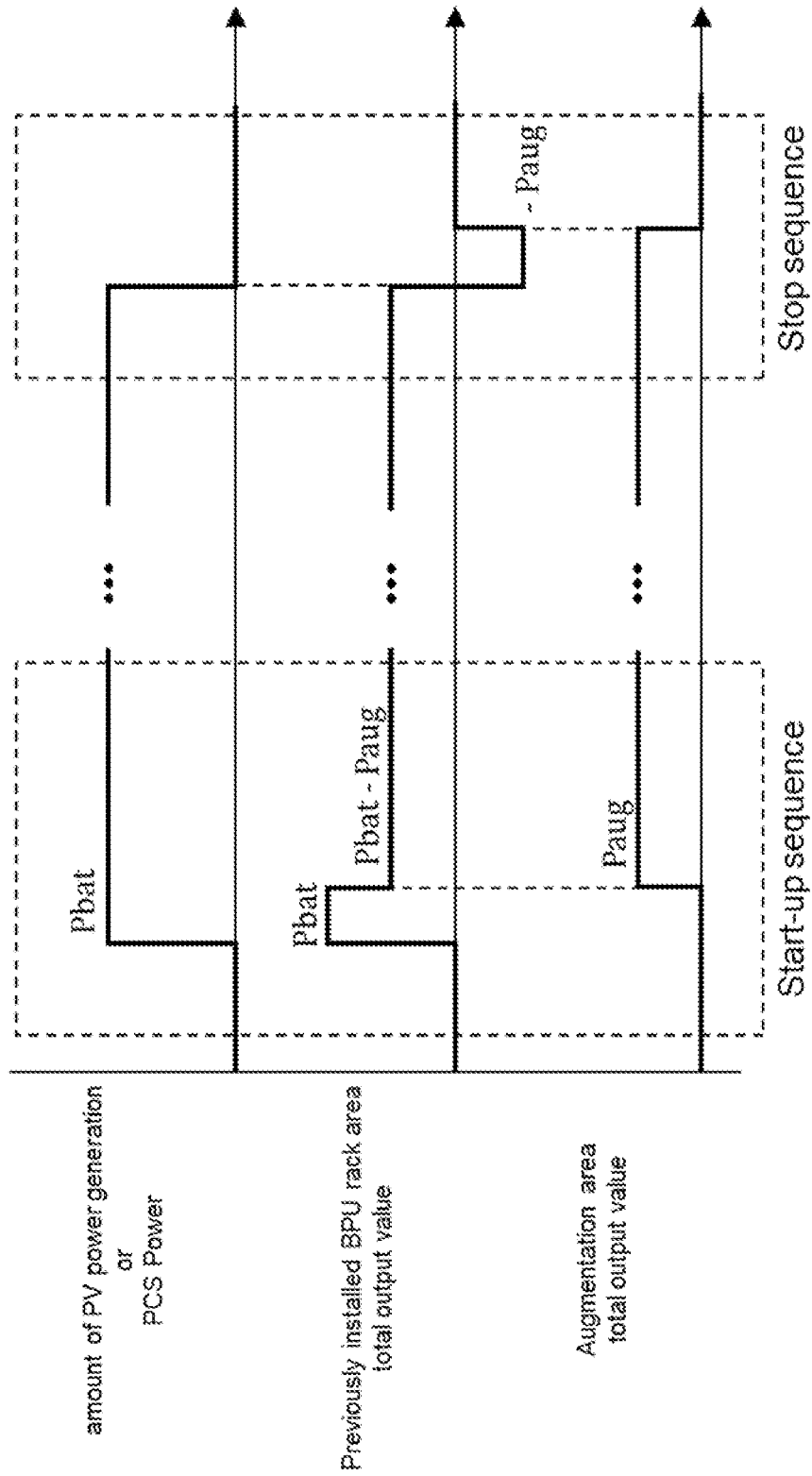
[Figure 5]

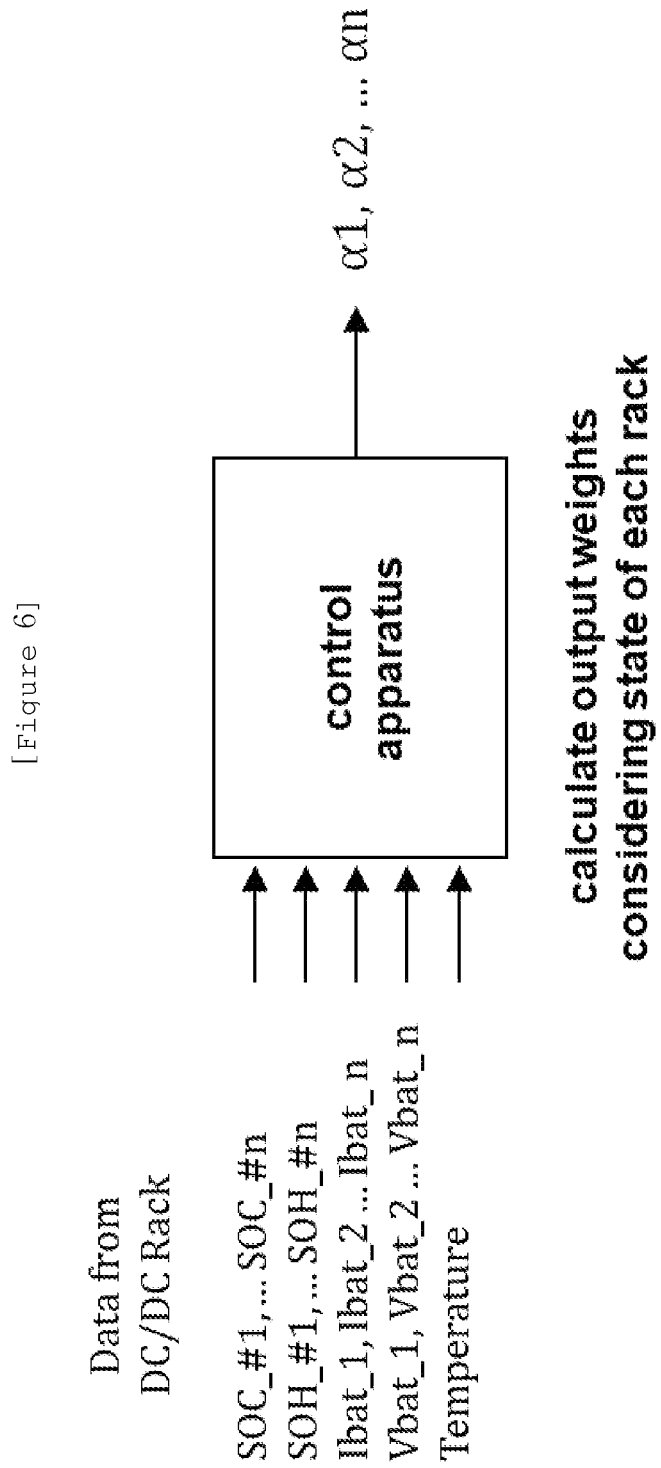

[Figure 7]
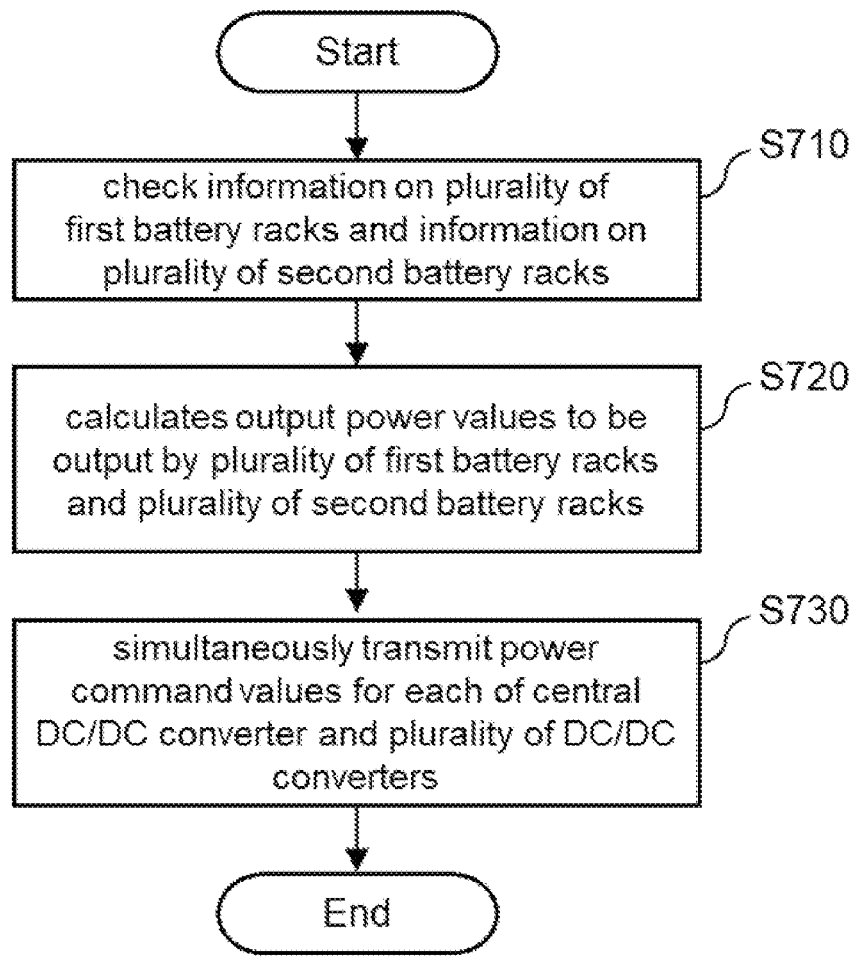

[Figure 8]
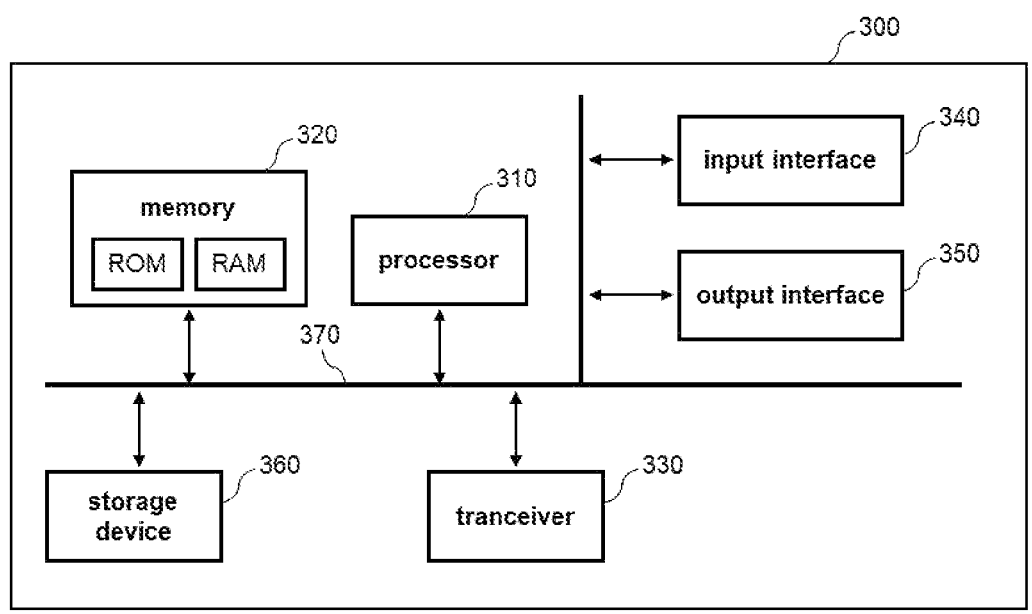

ENERGY STORAGE SYSTEM FOR OPTIMAL OPERATION OF NEWLY INSTALLED BATTERY RACK AND CONTROL METHOD THEREFOR

TECHNICAL FIELD

This application claims priority to and the benefit of Korean Patent Application No. 10-2022-0034429 filed in the Korean Intellectual Property Office on Mar. 21, 2022, the entire contents of which are incorporated herein by reference.

The present invention relates to an energy storage system and a method of controlling the energy storage system, and more particularly, to an energy storage system for an optimum operation of new or later installed battery racks and a method of controlling the energy storage system.

BACKGROUND ART

An energy storage system relates to various technologies, including renewable energy, a battery that stores electric power, and a power grid. Recently, as supply of smart grid and renewable energy is expanding, and efficiency and stability of power systems are emphasized, a demand for energy storage systems for power supply and demand control and power quality improvement is increasing. Depending on a purpose of use, energy storage systems may have different output and capacity. In order to configure a large-capacity energy storage system, a plurality of battery systems may be connected to provide the large-capacity energy storage system.

In an energy storage system, the performance of some battery racks may deteriorate over time, and accordingly, new battery racks may be added to existing battery racks so as to supplement the performance of the existing battery racks. However, performance difference may exist between a newly added battery rack and an existing battery rack, and thus, unnecessary rack balancing may be repeatedly performed due to the performance difference among the new and existing battery racks. Here, a problem arises that the new battery racks may follow the performance of the existing battery racks even though the new battery racks are added for performance compensation of the existing battery rack. In other words, even though new battery racks are added, the maximum performance (e.g. nominal capacity, period of use, etc.) possessed by the new battery racks cannot be fully utilized.

In addition, new battery racks can be added to an energy storage system including existing battery racks with various types of connection structures, but depending on the connection structure, the energy storage system may not be able to exert maximum performance in terms of charge/discharge efficiency and overall RTE (Round Trip Efficiency).

DETAILED DESCRIPTION OF THE INVENTION

Technical Problem

To obviate one or more problems of the related art, embodiments of the present disclosure provide an energy storage system for an optimum operation of one or more newly installed battery rack.

To obviate one or more problems of the related art, embodiments of the present disclosure also provide a control apparatus of an energy storage system for an optimum operation of one or more newly installed battery rack.

To obviate one or more problems of the related art, embodiments of the present disclosure also provide a method for controlling an energy storage system for an optimum operation of one or more newly installed battery rack.

Technical Solution

In order to achieve the objective of the present disclosure, an energy storage system may include a plurality of first battery racks; a central DC/DC (direct current/direct current) converter connected to the plurality of first battery racks and configured to perform power conversion; a plurality of second battery racks; and a plurality of DC/DC converters connected to the plurality of second battery racks respectively and configured to perform power conversion. Here, the central DC/DC converter and the plurality of DC/DC converters are connected in parallel to a DC bus connected to at least one of a power conversion device (PCS) and a power generation device.

The energy storage system may further include a control apparatus configured to control a charge/discharge output for each of the central DC/DC converter and the plurality of DC/DC converters using information of the plurality of first battery racks and information of the plurality of second battery racks.

The control apparatus may be configured to simultaneously deliver power command values for the central DC/DC converter and each of the plurality of DC/DC converters so that the plurality of first battery racks and the plurality of second battery racks output powers at the same time.

The control apparatus may be configured to check a charge/discharge power demand of the energy storage system and calculate output power values for the plurality of first battery racks and the plurality of second battery racks to output power using the charge/discharge power demand, the information of the plurality of first battery racks, and the information of the plurality of second battery racks.

The information of the plurality of first battery racks and the information of the plurality of second battery racks may include at least one of a number of battery racks, state of health (SOH), state of charge (SOC), output current, output power, and temperature of a battery rack of the plurality of first battery racks and the plurality of second battery racks, respectively.

The control apparatus may be configured to calculate an output weight for each second battery rack using the information of the plurality of second battery racks, and calculate a power command value for each of the plurality of second battery racks based on the output weight for each second battery rack and a number of the plurality of second battery racks compared to a total number of battery racks in the energy storage system.

The control apparatus may be configured to be included in an energy management system or a battery section controller of the energy storage system.

According to another embodiment of the present disclosure, a control apparatus of an energy storage system which is connected to a central DC/DC converter connected to a plurality of first battery racks and configured to perform power conversion and a plurality of DC/DC converters connected to a plurality of second battery racks respectively, connected in parallel to a DC bus with the central DC/DC converter, and configured to perform power conversion, the control apparatus may include at least one processor; and a memory configured to store at least one instruction executed by the at least one processor.

The at least one instruction may include an instruction to check information of the plurality of first battery racks and information of the plurality of second battery racks; and an instruction to control a charge/discharge output for each of the central DC/DC converter and the plurality of DC/DC converters using the information of the plurality of first battery racks and the information of the plurality of second battery racks.

The instruction to control the charge/discharge output may include an instruction to simultaneously deliver power command values for the central DC/DC converter and each of the plurality of DC/DC converters so that the plurality of first battery racks and the plurality of second battery racks output powers at the same time.

The instruction to check information of the plurality of first battery racks and the information of the plurality of second battery racks may include an instruction to check a charge/discharge power demand of the energy storage system. Here, the instruction to control the charge/discharge output may include an instruction to calculate output power values for the plurality of first battery racks and the plurality of second battery racks to output power using the charge/discharge power demand, the information of the plurality of first battery racks, and the information of the plurality of second battery racks.

The instruction to control the charge/discharge output may include an instruction to calculate an output weight for each second battery rack using the information of the plurality of second battery racks and calculate a power command value for each of the plurality of second battery racks based on the output weight for each second battery rack and a number of the plurality of second battery racks compared to a total number of battery racks in the energy storage system.

The control apparatus of the energy storage system may be configured to be included in an energy management system (EMS) or a battery section controller (BSC) of the energy storage system.

According to another embodiment of the present disclosure, a method controlling an energy storage system, the energy storage system including a central DC/DC converter which is connected to a plurality of first battery racks and configured to perform power conversion and a plurality of DC/DC converters which is connected to a plurality of second battery racks respectively, connected in parallel to a DC bus with the central DC/DC converter, and configured to perform power conversion, the method may include: checking information of the plurality of first battery racks and information of the plurality of second battery racks; and controlling a charge/discharge output for each of the central DC/DC converter and the plurality of DC/DC converters using the information of the plurality of first battery racks and the information of the plurality of second battery racks.

The controlling the charge/discharge output may include simultaneously delivering power command values for the central DC/DC converter and each of the plurality of DC/DC converters so that the plurality of first battery racks and the plurality of second battery racks output powers at the same time.

The checking of the information of the plurality of first battery racks and the information of the plurality of second battery racks may include checking a charge/discharge power demand of the energy storage system. Here, the controlling of the charge/discharge output may include calculating output power values for the plurality of first battery racks and the plurality of second battery racks to output power using the charge/discharge power demand, the information of the plurality of first battery racks, and the information of the plurality of second battery racks.

The controlling of the charge/discharge output may include: calculating an output weight for each second battery rack using the information of the plurality of second battery racks, and calculating a power command value for each of the plurality of second battery racks based on the output weight for each second battery rack and a number of the second battery racks compared to a total number of battery racks in the energy storage system.

The controlling of the energy storage system may be performed by a control apparatus which is configured to be included in an energy management system (EMS) or a battery section controller (BSC) in the energy storage system.

The charge/discharge power demand may be a sum of the output power values for the plurality of first battery racks and the plurality of second battery racks.

Advantageous Effects

According to embodiments of the present disclosure, unnecessary or excessive rack balancing can be avoided or reduced when new battery racks are added to an existing energy storage system.

Accordingly, performance of new battery racks can be utilized to the fullest (e.g., 100%).

In addition, the embodiment of the present invention can exert maximum performance in terms of charge and discharge efficiency and overall RTE (Round Trip Efficiency) of new battery racks.

BRIEF DESCRIPTION OF THE DRAWINGS

FIG. 1 is a block diagram of a conventional energy storage system.

FIG. 2 is a block diagram of an energy storage system according to embodiments of the present invention.

FIG. 3 illustrates a relationship between output values at start-up operation and stop operation of the energy storage system and output values in each battery area according to embodiments of the present invention.

FIG. 4 is a block diagram of an energy storage system according to a comparative example.

FIG. 5 illustrates a relationship between an output value at start-up operation and stop operation of an energy storage system and an output value in each battery area according to a comparative example.

FIG. 6 illustrates a concept of calculating an output weight for each DC/DC converter in the augmentation are according to embodiments of the present invention.

FIG. 7 is a flowchart of a method for controlling an energy storage system according to embodiments of the present invention.

FIG. 8 is a block diagram of a control apparatus of an energy storage system according to embodiments of the present invention.

BEST MODE

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

The used herein is for the purpose of describing specific embodiments only and are not intended to limit the present invention. As used herein, the singular forms "a", "an" and "the" are intended to include the plural forms as well, unless the context clearly indicates otherwise. It will be further understood that the terms "comprises", "comprising", "includes", "including" and/or "having", when used herein, specify the presence of stated features, integers, steps, operations, constitutional elements, components and/or combinations thereof, but do not preclude the presence or addition of one or more other features, integers, steps, operations, constitutional elements, components, and/or combinations thereof.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Some terms used herein are defined as follows.

State of Charge (SOC) refers to a current state of charge of a battery, represented in percent points [%], and State of Health (SOH) may be a current condition of a battery compared to its ideal or original conditions, represented in percent points [%].

A battery rack refers to a system of a minimum single structure assembled by connecting module units in series/parallel, module units being set by a battery manufacturer. A battery rack can be monitored and controlled by a battery management system (BMS). A battery rack may include several battery modules and a battery protection unit or any other protection device.

A battery bank refers to a group of large-scale battery rack systems configured by connecting several racks in parallel. A bank BMS for a battery bank may monitor and control several rack BMSs, each of which manages a battery rack.

A battery section controller (BSC) refers to a device that controls the topmost level of a battery system including a battery bank level structure or a multiple bank level structure. A battery section controller may also be referred to as a battery system control apparatus.

A nominal capacity (Nominal Capa.) refers to a capacity [Ah] of a battery set during development by a battery manufacturer.

Hereinafter, exemplary embodiments of the present invention will be described in detail with reference to the accompanying drawings.

FIG. 1 is a block diagram of a conventional energy storage system.

In an energy storage system (ESS), typically a battery cell is a minimum unit of storing energy or power. A series/parallel combination of battery cells may form a battery module, and a plurality of battery modules may form a battery rack. In other words, a battery rack can be a minimum unit of a battery system as a series/parallel combination of battery modules. Here, depending on a device or a system in which the battery is used, a battery rack may be referred to as a battery pack.

Referring to FIG. 1, a battery rack may include a plurality of battery modules and a battery protection unit (BPU) 10 or any other protection device. The battery rack can be monitored and controlled through a rack BMS (RBMS). The RBMS may monitor a current, a voltage and a temperature, among others, of each battery rack to be managed, calculate a State Of Charge (SOC) of the battery based on monitoring results, and control charging and discharging of the battery rack.

The battery protection unit (BPU) 10 is a device for protecting the battery rack from an abnormal current and a fault current in the battery rack. The BPU may include a main contactor (MC), a fuse, a circuit breaker (CB) or a disconnect switch (DS). The BPU 10 may control a battery system rack by rack through on/off controlling the main contactor (MC) based on a control from the Rack BMS. The BPU 10 may also protect the battery rack from a short circuit current using a fuse in the event of a short circuit. As such, the battery system can be controlled through a protection device such as a BPU 10 or a switchgear.

A battery section controller (BSC) 20 is located in each battery section which includes a plurality of batteries, peripheral circuits, and devices to monitor and control objects such as a voltage, a current, a temperature, and a circuit breaker. The battery section controller 20 is an uppermost control apparatus in a battery system including at least one battery bank with a plurality of battery racks. The battery section controller 20 may also be used as a control apparatus in a battery system having a plurality of bank level structures.

A power conversion system (PCS) 40 installed in each battery section performs charging/discharging based on a charge/discharge command (e.g., a charge or discharge command) from the energy management system (EMS) 30. The power conversion system (PCS) 40 may include a power conversion unit (DC/AC inverter) and a control apparatus. The output of each BPU 10 may be connected to a power generation device (e.g., phtovoltaic power generation device) and the PCS 40 through a DC bus, and the PCS 40 may be connected to a power grid. In addition, the EMS (or Power Management System (PMS)) 30 may manage the overall energy storage system (ESS).

In a conventional energy storage system as shown in FIG. 1, the battery system is managed only through protection elements such as a BPU and a switch gear. Thus, it is impossible to control the battery system based on individual characteristics of a battery rack or battery pack, such as battery capacity, SOH, and SOC.

In such an energy storage system, a plurality of battery racks may serve as voltage sources, and the PCS charges and discharges the battery racks using a constant current (CC) control method or a constant power (CP) control method. At the initial installation of the battery racks, the performances of battery racks are almost similar (if expressed in equivalent resistance, showing similar resistance values), and the charge/discharge current of each rack appears in a similar level. However, some racks may experience degradation over time. In this instance, new racks can be added to the existing energy system so as to supplement the system performance, which may be referred to as augmentation.

Here, there may be a performance difference between newly added battery racks and existing battery racks, which may cause repeated and unnecessary rack balancing according to an existing control method, and thus, the newly added battery racks eventually follow the degraded performance of the existing battery racks. Therefore, even though new battery racks are added, the maximum performance (e.g., nominal capacity, period of use, etc.) of the new battery racks cannot be fully utilized.

FIG. 2 is a block diagram of an energy storage system according to embodiments of the present invention.

FIG. 2 shows the energy storage system in which a plurality of new battery racks (New direct current/direct current (DC/DC) racks) are added to an energy storage system (e.g., a system disclosed in FIG. 1) including existing battery racks (already-installed BPU racks).

An energy storage system according to embodiments of the present invention may include battery racks, battery protection units (BPUs; 100), DC/DC converters 150, a central DC/DC converter 200 and a control apparatus 300, as shown in FIG. 2.

The central DC/DC converter may 200 perform power conversion in conjunction with existing battery racks (a plurality of first battery racks) controlled by the BPU (100). Here, the central DC/DC converter 200 is connected to the DC bus, and performs DC/DC conversion between the first battery racks and the DC bus. The central DC/DC converter 200 may include a main body and a DC/DC controller.

When augmentation is implemented in which one or more new battery racks (second battery racks) are added to supplement a plurality of battery racks (first battery racks) and BPUs 100 operated previously, that is, when existing battery racks (Old Racks) and new battery racks (New Racks) coexist by augmentation, the performance of the new battery racks may deteriorate rapidly or a problem of unbalance among battery racks may occur if the energy storage system is managed by an existing control method that had managed the existing battery racks.

Therefore, the energy storage system according to embodiments of the present invention may use a DC/DC converter 150 for a newly added battery rack (second battery rack) in the augmentation area instead of a battery protection unit (BPU). Here, the DC/DC converters 150 may be connected to the DC bus and perform DC/DC conversion between the second battery racks and the DC bus. Each DC/DC converter 150 may include a main body and a DC/DC control apparatus.

The DC/DC converter 150 arranged in the augmentation area allows the existing battery racks (Old Racks) in the existing area and the new battery racks (New Racks) in the augmentation area to be electrically separated and operated. The output of the DC/DC converter 150 can be actively controlled by a user, and thus, even if there is a difference in SOC, SOH, and capacity among the existing battery racks (Old Racks) and the new battery racks (New Racks), it is possible to control the battery output considering the characteristics of each battery rack.

The central DC/DC converter 200 and the plurality of DC/DC converters 150 may be connected in parallel to a DC bus which is connected to at least one of a power conversion device 400 and a power generation device 500, as shown in FIG. 2. In other words, the energy storage system according to embodiments of the present invention is connected to the power conversion device 400 or the power generation device 500 in a DC-Coupled structure, and, when performing augmentation of new racks, each of the plurality of DC/DC converters 150 managing the new racks is connected in parallel to the DC bus to form a parallel structure with the central DC/DC converter 200 that manages the existing racks in an integrated manner.

The central DC/DC converter 200 and the plurality of DC/DC converters 150 are connected to the control apparatus 300. The control apparatus 300 may monitor and manage states of the battery racks (first battery racks) disposed in the existing area as well as the battery racks (second battery racks) disposed in the augmentation area. In addition, the control apparatus 300 may control charge/discharge output for each of the central DC/DC converter 200 and the plurality of DC/DC converters 150 using information of the first and second battery racks.

The control apparatus 300 according to embodiments of the present invention may be implemented to be included in an energy management system (EMS), a power management system (PMS), or a battery section controller (BSC), and may perform a control method of an energy storage system to be described below.

Here, the energy management system (EMS) is a device that manages the energy storage system as a whole, and may be also called as a power management system (PMS). In addition, a battery section controller (BSC) is a device that manages a state of each rack and informs an upper system (e.g., EMS) of a limit value of the battery that can be output and may be implemented in a form mounted and installed on a desktop personal computer (PC).

The power conversion device (PCS, 400) is a device that performs actual charging and discharging based on a charging and discharging command received from the control apparatus 300 (e.g., EMS) and may be configured to include a DC/AC power converter and a controller.

The power generation device 500 is a device that generates power and may include at least one of a power generation devices using sunlight, solar heat, wind power, and geothermal heat. Somehow, the type of power generation device 500 is not an essential component of the present invention, and thus, the scope of the present invention is not limited to these entities.

Hereinafter, operations of an energy storage system according to embodiments of the present invention will be described with reference to FIG. 3. FIG. 3 illustrates a relationship between output values at start-up operation and stop operation of the energy storage system and output values in each battery area according to embodiments of the present invention.

First, a start-up sequence of the energy storage system according to embodiments of the present invention will be described.

The control apparatus 300 may check a charge/discharge power demand (Pbat) of the energy storage system. Here, the charge/discharge power demand (Pbat) may mean an amount of power required for charging the energy storage system to be supplied by the PCS 400 or the power generation device 500, or an amount of electric power required for discharging through the PCS 400 to be supplied to the grid.

The control apparatus 300 may control charge/discharge outputs of the central DC/DC converter 200 and the plurality of DC/DC converters 150, respectively, using the information of the existing racks and the information of the new racks.

Here, the control apparatus 300 is aware of the information about one or more BPU rack (used as a concept including battery racks and a BPU) disposed in the existing area and one or more DC/DC rack disposed (used as a concept including battery racks and a DC/DC converter) in the augmentation area.

The control apparatus 300 may calculate a charge/discharge power value Paug to be output by the DC/DC racks in the augmentation area based on the charge/discharge power demand (Pbat) and quantity information of the battery racks.

In addition, the control apparatus 300 may calculate an output weight for each battery rack based on the state information (SOC, SOH, output current, output power, temperature, etc.) of each battery rack located in the augmentation area. The output value for each DC/DC rack may be calculated by multiplying the output weight of each battery rack by Paug. In other words, the control apparatus 300 may calculate a charge/discharge command value for each DC/DC converter 150 in consideration of remaining energy of the DC/DC racks compared to the BPU racks.

The control apparatus 300 may calculate the charge/discharge power value to be output by the BPU racks based on the charge/discharge power demand (Pbat) and the charge/discharge power value Paug to be output by the new racks. Here, the charge/discharge power value to be output by the BPU rack may be determined as a value obtained by subtracting the charge/discharge power value Paug to be output by the DC/DC racks from the charge/discharge power demand (Pbat), which is (Pbat-Paug).

The control apparatus 300 may simultaneously transmit power command values for each of the central DC/DC converter 200 and the plurality of DC/DC converters 150. Since the central DC/DC converter 200 and the plurality of DC/DC converters 150 are connected in parallel at a same level as shown in FIG. 3, the outputs of the central DC/DC converter and the plurality of DC/DC converters can be controlled according to repective power command values at the same time.

Next, the stop sequence of the energy storage system is examined.

When the system is stopped, the charge/discharge power demand (Pbat) becomes zero. Here, the control apparatus 300 may check the charge/discharge power demand which has changed to 0, and calculate the power command value for each of the BPU rack and the DC/DC rack as 0. Thereafter, the control apparatus 300 may simultaneously transmit power command values for each of the central DC/DC converter 200 and the plurality of DC/DC converters 150, and control charge/discharge outputs to stop at the same time as shown in FIG. 3.

Hereinafter, operations of the energy storage system according to a comparative example of the present invention will be described with reference to FIGS. 4 and 5. FIG. 4 is a block diagram of an energy storage system according to a comparative example and FIG. 5 illustrates a relationship between an output value at start-up operation and stop operation of an energy storage system and an output value in each battery area according to a comparative example.

Referring to FIG. 4, in an energy storage system according to a comparative example of the present invention, when new racks are augmented, new DC/DC racks are connected to output terminals of BPU racks. In other words, the comparative example has a structure in which the DC/DC converter 150' of the new battery racks is connected in parallel with the BPUs 100' of the existing battery racks rather than the central DC/DC converter 200'.

First, a start-up sequence of the energy storage system according to a comparative example will be described.

Referring to FIG. 5, the control apparatus 300' checks a charge/discharge power demand (Pbat) of the energy storage system. Then, the control apparatus 300' transfers a power command value Pbat to the central DC/DC converter 200'. The central DC/DC converter 200' outputs corresponding power Pbat according to the charge/discharge command Pbat. Here, power of Pbat is (temporarily) output first from the BPU racks disposed in the existing area.

Here, the control apparatus 300' is aware of quantity information of the BPU racks disposed in the existing area and the DC/DC racks in the new area and monitor a total output value (Pbat) from all battery racks interlocking with the control apparatus. The control apparatus 300' may calculate a value (Paug) to be output by the DC/DC racks in a new area based on a value (Pbat) output by BPU racks in the existing area and quantity information of battery racks.

The control apparatus 300' may calculate an output value of each DC/DC rack based on state information (SOC, SOH, etc.) of each battery rack located in the augmentation area. Thereafter, the control apparatus 300' transmits a charge/discharge command to each DC/DC converter 150', so that the plurality of DC/DC converters 150' output a total charge/discharge power of Paug. The existing BPU racks output power of (Pbat-Paug) according to the output of the new racks.

Next, a stop sequence of the energy storage system according to the comparative example will be described.

When the system is stopped, the output of the central DC/DC converter (200') becomes zero. Here, since the existing BPU area is a passive element area, the output of the battery racks changes rapidly. However, since the DC/DC area, which is an augmentation area, operates under the command of the control apparatus 300', the DC/DC area maintains its output Paug for a very short moment. Accordingly, the BPU area temporarily accepts the corresponding output Paug. In the meantime, the control apparatus 300' detects that the output of the central DC/DC converter 200' has become 0 and modifies the output command value Paug for the augmentation area to 0. Through this process, outputs of all racks in the existing BPU area and the augmentation DC/DC area become 0 and the system operation stops.

The energy storage system according to the present invention has the following advantages compared to the comparative example.

First of all, the energy storage system according to the present invention does not cause a time delay in charge/discharge outputs between the existing BPU racks and the new DC/DC racks in start-up and stop sequences. In the energy storage system according to the present invention, since the DC/DC converters 150 of the new racks are connected in parallel to the central DC/DC converter 200 at a same level, outputs can be controlled according to each power command at the same time as shown in FIG. 3. On the other hand, in the energy storage system according to the comparative example, the DC/DC converters 150' of the new racks is connected in parallel with the BPUs 100' of the existing battery racks, and all of them are managed by the central DC/DC converter 200'. In this configuration, as shown in FIG. 5, a time delay of charge/discharge outputs between the existing BPU rack and the new DC/DC rack may occur.

Next, the energy storage system according to the present invention is advantageous in terms of charge/discharge efficiency of the augmentation area and overall RTE (Round Trip Efficiency). The energy storage system according to the comparative example passes through both the central DC/DC converter 200' and the DC/DC converters 150' as shown in FIG. 4 during charging and discharging of new racks. Charging efficiency ($\eta_{ch}$), discharging efficiency ($\eta_{disch}$), and total RTE efficiency ($\eta_{RTE}$) of the augmentation area in the energy storage system according to the comparative example may be described as equations 1 to 3 below.

$$\eta_{ch} = \eta_{central\ DC/DC} * \eta_{rack\ DC/DC} \quad \text{[Equation 1]}$$

Here, $\eta_{centralDC/DC}$ is conversion efficiency of the central DC/DC converter and $\eta_{rackDC/DC}$ is conversion efficiency of the DC/DC converters.

$$\eta_{disch} = \eta_{PCS} * \eta_{central\ DC/DC} * \eta_{rack\ DC/DC} \quad \text{[Equation 2]}$$

Here, $\eta_{PCS}$ is conversion efficiency of a power conversion device.

$$\eta_{RTE} = (\eta_{central\ DC/DC} * \eta_{rack\ DC/DC}) * \quad \text{[Equation 3]}$$
$$\eta_{rack} * (\eta_{PCS} * \eta_{central\ DC/DC} * \eta_{rack\ DC/DC})$$

Here, $\eta_{rack}$ is efficiency of battery racks.

On the other hand, Charging efficiency ($\eta_{ch}$), discharging efficiency ($\eta_{disch}$), and total RTE efficiency ($\eta_{RTE}$) of the augmentation area in the energy storage system according to the present invention may be expressed as equations 4 to 6 below.

$$\eta_{ch} = \eta_{rack\ DC/DC} \quad \text{[Equation 4]}$$
$$\eta_{disch} = \eta_{PCS} * \eta_{rack\ DC/DC} \quad \text{[Equation 5]}$$
$$\eta_{RTE} = (\eta_{rack\ DC/DC}) * \eta_{rack} * (\eta_{PCS} * \eta_{rack\ DC/DC}) \quad \text{[Equation 6]}$$

As shown in FIG. 2, the energy storage system according to the present invention is charged and discharged without passing through the central DC/DC converter 200 when a new rack is charged and discharged, so the charge/discharge efficiency and the overall RTE efficiency are higher than those of the comparative example. When the conversion efficiency ($\eta_{central\ DC/DC}$) of the central DC/DC converter is 98%, the energy storage system according to the present invention may present an overall RTE efficiency that is about 1.04 times higher than that of the comparative example.

FIG. 6 illustrates a concept of calculating an output weight for each DC/DC converter in an augmentation area according to embodiments of the present invention.

According to embodiments of the present invention, the control apparatus 300 may estimate a state of each rack based on information such as SOC, SOH, output current, output voltage, output power, and temperature of the battery rack disposed in the augmentation area and the output weight of each DC/DC rack can be calculated based on these values.

Specifically, referring to FIG. 6, the control apparatus 300 may receive data such as SOC, SOH, output current, output voltage, temperature of each battery rack from each DC/DC rack. Here, the control apparatus 300 may calculate output weights $\alpha_1, \ldots, \alpha_n$ of each DC/DC rack using the received information.

Equation 7 below shows an equation for calculating a total output command value Paug for the augmentation area.

$$Paug = n/(n+m) * Pbat \quad \text{[Equation 7]}$$

Here, m is a number of BPU racks and n is a number of DC/DC racks.

Equation 8 shows equations for calculating output command values $P_{DC/DC-1}$ to $P_{DC/DC-n}$ of the DC/DC racks in the augmentation area.

$$P_{DC/DC-1} = \alpha_1 \times P_{aug} \quad \text{[Equation 8]}$$
$$P_{DC/DC-2} = \alpha_2 \times P_{aug}$$
$$\ldots$$
$$P_{DC/DC-n} = \alpha_n \times P_{aug}$$
$$\alpha_1 + \alpha_2 + \ldots + \alpha_n = 1$$

It can be seen from equation 8 that the output command value of each DC/DC rack is calculated by multiplying the total output command value Paug for the augmentation area by the weight for each rack. Here, the sum of the output weights of each DC/DC rack may be defined as 1.

FIG. 7 is a operational flowchart of a method for controlling an energy storage system according to embodiments of the present invention.

The control method of an energy storage system according to embodiments of the present invention may be performed by a control apparatus configured in an energy storage system, the energy storage system including a central DC/DC converter connected to the plurality of first battery racks (BPU racks) and configured to perform power conversion and a plurality of DC/DC converters connected to the plurality of second battery racks (DC/DC racks) respectively, connected in parallel to a DC bus with the central DC/DC converter, and configured to perform power conversion.

The control apparatus may check information on a plurality of first battery racks and information on a plurality of second battery racks (S710).

The control apparatus may calculates output power values to be output by the plurality of first battery racks and the plurality of second battery racks by using the information of the plurality of first battery racks and the information of the plurality of second battery racks (S720).

Here, the apparatus control may check the charge/discharge power demand of the energy storage system, and use the checked charge/discharge power demand, information on a plurality of first battery racks, and information on a plurality of second battery racks to determine output power values to be output by a plurality of first battery racks and a plurality of second battery racks.

In addition, the control apparatus may calculate an output weight for each of the second battery racks, using one or more information of a number of second battery racks, SOH, SOC, output current, output power, and temperature, and may derive a power command value for each of the second battery racks based on the output weights of the second battery racks.

Then, the control apparatus may simultaneously transmit power command values for each of the central DC/DC converter and the plurality of DC/DC converters so that the plurality of first battery racks and the plurality of second battery racks output powers at the same time (S730).

FIG. 8 is a block diagram of a control apparatus of an energy storage system according to embodiments of the present invention.

Hereinafter, a main configuration of the control apparatus 300 for performing the control method according to embodiments of the present invention will be described with reference to FIG. 8.

The control apparatus 300 according to embodiments of the present invention may be connected to a central DC/DC converter connected to the plurality of first battery racks and configured to perform power conversion, may be connected to a plurality of DC/DC converters connected to the plurality of second battery racks respectively, connected in parallel to a DC bus with the central DC/DC converter, and configured to perform power conversion, and include at least one processor 310, a memory 320 configured to store at least one instruction executed by the at least one processor, and a transceiver 330 for communicating with other elements in the energy storage system.

The control apparatus 300 according to embodiments of the present invention may be implemented by being included in an energy management system (EMS) or a battery section controller (BSC), but the scope of the present invention is not limited to these entities.

The at least one instruction executed by the at least one processor may include an instruction to check information of the plurality of first battery racks and the information of the plurality of second battery racks; and an instruction to control a charge/discharge output for each of the central DC/DC converter and the plurality of DC/DC converters using the information of the plurality of first battery racks and the information of the plurality of second battery racks.

The instruction to control a charge/discharge output may include an instruction to simultaneously deliver power command values for the central DC/DC converter and each of the plurality of DC/DC converters so that the plurality of first battery racks and the plurality of second battery racks output powers at the same time.

The instruction to check information of the plurality of first battery racks and the information of the plurality of second battery racks may include an instruction to check a charge/discharge power demand of the energy storage system. Here, the instruction to control a charge/discharge output includes an instruction to calculate the output power values for the plurality of first battery racks and the plurality of second battery racks to output using the charge/discharge power demand, the information of the plurality of first battery racks, and the information of the plurality of second battery racks.

The instruction to control a charge/discharge output may include an instruction to calculate an output weight for each second battery rack using the information about the plurality of second battery racks, and calculate a power command value for each of the second battery racks based on the output weight for each second battery rack and the number of the second battery racks compared to the total number of battery racks in the energy storage system.

The control apparatus 300 of the energy storage system may further include an input interface 340, an output interface 350, a storage device 360, and the like. Respective components included in the control apparatus 300 may be connected by a bus 370 to communicate with each other.

Here, the processor 310 may mean a central processing unit (CPU), a graphics processing unit (GPU), or a dedicated processor on which methods according to embodiments of the present invention are performed. The memory (or storage device) may comprise at least one of a volatile storage medium and a non-volatile storage medium. For example, the memory may include at least one of read only memory (ROM) and random access memory (RAM).

The operations of method according to the embodiments of the present invention may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

Although some aspects of the invention have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit. In some embodiments, one or more of the most important method steps may be performed by such an apparatus.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. An energy storage system comprising:
a plurality of first battery racks including a plurality of battery protection units (BPUs), respectively;
a central direct current/direct current (DC/DC) converter connected to the plurality of BPUs of the plurality of first battery racks and configured to perform power conversion;
a plurality of second battery racks; and
a plurality of DC/DC converters connected to the plurality of second battery racks respectively and configured to perform power conversion,
wherein the central DC/DC converter and the plurality of DC/DC converters are connected in parallel to a DC bus connected to at least one of a power conversion device (PCS) and a power generation device,
wherein the plurality of second battery racks connected to the plurality of DC/DC converters as a whole provide a second portion of a charge/discharge power demand to augment a first portion of the charge/discharge power demand output from the plurality of first battery racks as a whole, wherein the energy storage system further comprises a control apparatus configured to control a charge/discharge output for each of the central DC/DC converter and the plurality of DC/DC converters using information of the plurality of first battery racks and information of the plurality of second battery racks, and wherein the control apparatus is configured to simultaneously deliver power command values for the central DC/DC converter and each of the plurality of DC/DC converters so that the plurality of first battery racks and the plurality of second battery racks output powers at the same time.

2. The energy storage system of claim 1, wherein the control apparatus is configured to check the charge/discharge power demand of the energy storage system and calculate output power values for the plurality of first battery racks and the plurality of second battery racks to output power using the charge/discharge power demand, the information of the plurality of first battery racks, and the information of the plurality of second battery racks.

3. The energy storage system of claim 2, wherein the information of the plurality of first battery racks and the information of the plurality of second battery racks include at least one of a number of battery racks, state of health (SOH), state of charge (SOC), output current, output power, and temperature of a battery rack of the plurality of first battery racks and the plurality of second battery racks, respectively.

4. The energy storage system of claim 2, wherein the control apparatus is configured to:
calculate an output weight for each second battery rack using the information of the plurality of second battery racks; and
calculate a power command value for each of the plurality of second battery racks based on the output weight for each second battery rack and a number of the plurality of second battery racks compared to a total number of battery racks in the energy storage system.

5. The energy storage system of claim 2, wherein the charge/discharge power demand is a sum of the output power values for the plurality of first battery racks and the plurality of second battery racks.

6. The energy storage system of claim 1, wherein the control apparatus is configured to be included in an energy management system or a battery section controller of the energy storage system.

7. A control apparatus of an energy storage system which is connected to a central direct current/direct current (DC/DC) converter connected to a plurality of first battery racks including a plurality of battery protection units (BPUs), respectively, and configured to perform power conversion and a plurality of DC/DC converters connected to a plurality of second battery racks respectively, connected in parallel to a DC bus with the central DC/DC converter, and configured to perform power conversion, the control apparatus comprising:
at least one processor; and
a memory configured to store at least one instruction executed by the at least one processor,
wherein the at least one instruction includes:
an instruction to check information of the plurality of first battery racks and information of the plurality of second battery racks; and
an instruction to control a charge/discharge output for each of the central DC/DC converter and the plurality of DC/DC converters using the information of the plurality of first battery racks and the information of the plurality of second battery racks, wherein the plurality of second battery racks connected to the plurality of DC/DC converters as a whole provide a second portion of a charge/discharge power demand to augment a first portion of the charge/discharge power demand output from the plurality of first battery racks as a whole, and wherein the instruction to control the charge/discharge output includes an instruction to simultaneously deliver power command values for the central DC/DC converter and each of the plurality of DC/DC converters so that the plurality of first battery racks and the plurality of second battery racks output powers at the same time.

8. The control apparatus of claim 7, wherein the instruction to check information of the plurality of first battery racks and the information of the plurality of second battery racks includes an instruction to check the charge/discharge power demand of the energy storage system, and wherein the instruction to control the charge/discharge output includes an instruction to calculate output power values for the plurality of first battery racks and the plurality of second battery racks to output power using the charge/discharge power demand, the information of the plurality of first battery racks, and the information of the plurality of second battery racks.

9. The control apparatus of claim 8, wherein the instruction to control the charge/discharge output includes an instruction to:
calculate an output weight for each second battery rack using the information of the plurality of second battery racks; and
calculate a power command value for each of the plurality of second battery racks based on the output weight for each second battery rack and a number of the plurality of second battery racks compared to a total number of battery racks in the energy storage system.

10. The control apparatus of claim 8, wherein the charge/discharge power demand is a sum of the output power values for the plurality of first battery racks and the plurality of second battery racks.

11. The control apparatus of claim 7, wherein the control apparatus of the energy storage system is configured to be included in an energy management system (EMS) or a battery section controller (BSC) of the energy storage system.

12. A method of controlling an energy storage system, the energy storage system including a central direct current/direct current (DC/DC) converter which is connected to a plurality of first battery racks including a plurality of battery protection units (BPUs), respectively, and configured to perform power conversion and a plurality of DC/DC converters which are connected to a plurality of second battery racks respectively, connected in parallel to a DC bus with the central DC/DC converter, and configured to perform power conversion, the method comprising:
checking information of the plurality of first battery racks and information of the plurality of second battery racks; and
controlling a charge/discharge output for each of the central DC/DC converter and the plurality of DC/DC converters using the information of the plurality of first battery racks and the information of the plurality of second battery racks, wherein the plurality of second battery racks connected to the plurality of DC/DC converters as a whole provide a second portion of a charge/discharge power demand to augment a first portion of the charge/discharge power demand output from the plurality of first battery racks as a whole, and wherein the controlling of the charge/discharge output includes simultaneously delivering power command values for the central DC/DC converter and each of the plurality of DC/DC converters so that the plurality of first battery racks and the plurality of second battery racks output powers at the same time.

13. The method of claim 12, wherein the checking of the information of the plurality of first battery racks and the information of the plurality of second battery racks includes checking the charge/discharge power demand of the energy storage system, and wherein the controlling of the charge/discharge output includes calculating output power values for the plurality of first battery racks and the plurality of second battery racks to output power using the charge/discharge power demand, the information of the plurality of first battery racks, and the information of the plurality of second battery racks.

14. The method of claim 13, wherein the controlling of the charge/discharge output includes:

calculating an output weight for each second battery rack using the information of the plurality of second battery rack; and calculating a power command value for each of the plurality of second battery racks based on the output weight for each second battery rack and a number of the plurality of second battery racks compared to a total number of battery racks in the energy storage system.

15. The method of claim 13, wherein the charge/discharge power demand is a sum of the output power values for the plurality of first battery racks and the plurality of second battery racks.

16. The method of claim 12, wherein the controlling of the energy storage system is performed by a control apparatus which is configured to be included in an energy management system or a battery section controller of the energy storage system.

* * * * *